United States Patent [19]

Ronden

[11] 3,936,417

[45] Feb. 3, 1976

[54] COILABLE POLYVINYL CHLORIDE PRODUCTS AND METHODS AND COMPOSITIONS FOR PRODUCING THE SAME

[75] Inventor: Clifford Paul Ronden, Edmonton, Canada

[73] Assignee: Grandview Industries, Limited, Rexdale, Canada

[22] Filed: June 5, 1970

[21] Appl. No.: 43,944

Related U.S. Application Data

[63] Continuation-in-part of Ser. No. 746,737, July 23, 1968, abandoned, which is a continuation-in-part of Ser. No. 656,057, July 26, 1967, abandoned.

[52] U.S. Cl.......... 260/42.45; 138/118; 260/23 XA; 260/42.44; 260/42.46; 260/42.47; 260/42.49; 260/45.75 V; 260/876 R; 260/880 R; 260/889; 260/891; 260/897 C; 260/899; 264/209; 264/211

[51] Int. Cl.².................. C08L 23/28; C08L 27/06; C08L 55/02; B29D 23/04

[58] Field of Search ....... 260/23 XA, 876 R, 897 C, 260/899, 889; 264/209

[56] References Cited

UNITED STATES PATENTS

| | | | |
|---|---|---|---|
| 2,467,550 | 4/1949 | Fletcher et al.......................... | 260/23 |
| 3,043,795 | 7/1962 | Roberts et al. ....................... | 260/33.8 |
| 3,058,943 | 10/1962 | Gray et al........................... | 260/33.6 |
| 3,085,082 | 4/1963 | Baer et al. ........................... | 260/897 |
| 3,145,187 | 8/1964 | Hankey et al.......................... | 260/23 |
| 3,248,359 | 4/1966 | Maloney................................ | 260/41 |
| 3,257,261 | 6/1966 | Hochberg ........................... | 260/859 |
| 3,297,629 | 1/1967 | Kauder ............................ | 260/45.75 |
| 3,367,997 | 2/1968 | Smith................................ | 260/891 |
| 3,388,196 | 6/1968 | Farrell ................................ | 264/75 |
| 3,407,171 | 10/1968 | Segre ................................ | 260/41 |
| 3,432,576 | 3/1969 | Beer.................................... | 260/878 |
| 3,536,788 | 10/1970 | Hurwitz et al. ...................... | 260/890 |
| 3,560,592 | 2/1971 | Decroly et al. ....................... | 260/876 |
| 3,641,206 | 2/1972 | Weitzel et al....................... | 260/876 |

FOREIGN PATENTS OR APPLICATIONS

| | | | |
|---|---|---|---|
| 626,534 | 8/1961 | Canada............................ | 260/876 |

OTHER PUBLICATIONS

Chevassus et al., "The Stabilization of Polyvinyl Chloride", 1963, pp. 238 and 239.

*Primary Examiner*—Melvyn I. Marquis
*Assistant Examiner*—R. A. White
*Attorney, Agent, or Firm*—Roylance, Abrams, Berdo & Kaul

[57] ABSTRACT

Polyvinyl chloride pipe capable of being coiled and uncoiled under conditions involved in installing under ground by plowing in, and having characteristics meeting requirements necessary for use in natural gas distribution, and compositions and methods for producing such pipe.

8 Claims, No Drawings

COILABLE POLYVINYL CHLORIDE PRODUCTS AND METHODS AND COMPOSITIONS FOR PRODUCING THE SAME

This invention relates to polyvinyl chloride pipe and like extruded products having both adequate flexibility to be coiled and sufficiently high impact and tensile strengths to satisfy strict commercial requirements.

A number of potential commercial applications for extruded polyvinyl chloride require both a marked degree of flexibility and good tensile and impact strengths, as well as a high heat distortion temperature, but the art has been held back by the fact that, while prior-art workers have been able to achieve adequate flexibility, this has been done at the expense of tensile and impact strengths, heat distortion temperature, and other properties of the product. One important example of such an application is use of extruded pipe for conducting natural gas, a purpose for which polyvinyl chloride pipe is admirably suited in many respects. Wide acceptance of rigid polyvinyl chloriide pipes heretofore available has not developed because of the relatively high cost of installing lengths of rigid pipe under ground. The cost of underground installation becomes favorable if the pipe is coilable, since a continuous length of coilable pipe can easily and quickly be "plowed in" with conventional equipment which is readily available. However, prior-art attempts to extrude coilable polyvinyl chloride pipe have been limited mainly to use of chlorinated polyethylene as a modifying agent for the polyvinyl chloride, and the amount of chlorinated polyethylene required, usually in excess of 30% of the polyvinyl chloride weight, has so decreased the tensil strength and heat distortion temperature of the pipe that the pipe could not be used for such purposes as handling natural gas.

It is accordingly a general object of the invention to provide coilable polyvinyl chloride pipe having such high impact strength, tensile strength, and heat distortion temperature as to be entirely satisfactory for conducting natural gas and for like purposes. Similarly, the invention provides improved dry blend extrusion compositions and methods by which such a product can be manufactured.

Another object is to devise polyvinyl chloride dry blend extrusion compositions, especially useful in production of coilable pipe, which compositions have less tendency toward auto-catalytic decomposition of the polyvinyl chloride during extrusion than has heretofore been the case.

A further object is to provide uniform, free flowing, dry blended polyvinyl chloride extrusion compositions.

Another object is to produce coilable polyvinyl chloride pipe by using chlorinated polyethylene as a flexibilizing agent, with the amount of chlorinated polyetylene being minimized and with the effect thereof being enhanced because early thermal degradation of the chlorinated polyethylene is avoided.

A still further object is to provide highly economical dry blended compositions and method for making extruded polyvinyl chloride products.

Yet another object is to provide, as a new product, coilable polyvinyl chloride pipe suitable for natural gas transmission.

Generally stated, the invention is based upon the discovery that elongated polyvinyl chloride products, such as pipe, having marked flexibility, excellent impact and tensile strengths, and high heat distortion temperatures, can be obtained by extruding under controlled conditions a composition comprising polyvinyl chloride, an amount of chlorinated polyethylene equal to 4–12% of the weight of the polyvinyl chloride, the chlorinated polyethylene acting as a flexibilizing modifier for the polyvinyl chloride, and a small proportion of a processing aid-secondary modifier which, though relatively incompatible with the polyvinyl chloride, is compatible with the chlorinated polyethylene, the processing aid-secondary modifier having a heat distortion temperature of at least 155°F. and serving both to favorably modify the polyvinyl chloride and to offset the deterioration in tensile strength and heat distortion temperature normally attendant to use of chlorinated polyethylene. The extrusion compositions employed are specially dry blended so as to be in the form of homogeneous, free flowing, finely particulate mixtures essentially free from agglomerates or lumps. According to method embodiments of the invention, the improved polyvinyl chloride composition is introduced into a conventional screw-operated extruder equipped with a die having an annular orifice, and the extruder is operated under controlled conditions of temperature and head pressure to thermally plastify the polymeric composition and force the same continually through the die, the operating conditions including maintenance of the barrel of the extruder under a reverse temperature profile. Pipe so obtained is a fusion blend of the polyvinyl chloride, chlorinated polyethylene, and polymeric processing aid-secondary modifier, which blend contains the inorganic filler distributed uniformly therethrough, and is unique in that it has adequate flexibility to be coiled, e.g., into coils of 4 ft. diameter for ½ inch O.D. pipe and coils of 8 ft. diameter for 2 inch O.D. pipe, yet has an impact strength of at least 85 ft. lbs. for 2 inch O.D. pipe, as determined by the ASTM TUP drop test at 0°C., an apparent tensile strength of at least 7000 p.s.i., as determined by Canadian Standards Association test CSA B1374 — Plastic Pipe for Gas Service, Item 5.5, a sustained pressure capacity of at least 430 p.s.i., for 2 inch O.D. pipe, as determined by ASTM D1598-58T with a 1-hour test period, and a heat distortion temperature of at least 155°F. as determined by ASTM D648-56 at 264 p.s.i. Extruded products according to the invention are especially suitable for use under conditions of low ambient temperature. Thus, for example, 2 inch O.D. pipe according to the invention has been successfully uncoiled from an 8 ft. coil and then recoiled while at −28°F., with no damage to the pipe.

Polyvinyl chlorides employed in accordance with the invention are homopolymers of such molecular weight as to have a Fikentscher K-value of 60–80, as determined in 1% cyclohexanone at 25°C. Advantageously, polyvinyl chloride having a K-value of 60–70 is employed, the difficulties encountered in processing being magnified as the K-value increases above 70. The polyvinyl chloride is used in particulate form, with an average particle size in the range of 100–400 mesh. Best results are obtained when the polyvinyl chloride has an average particle size in the range of 140–300.

Chlorinated polyethylenes suitable for use according to the invention are those which, prepared by conventional procedures such as chlorination of the polyethylene in solution or in aqueous dispersion, have a chlorine content of 30–55% by weight and a molecular weight such as to yield melt viscosities, in poises/1000, of 20-30. The chlorinated polymer is used in particulate form, with an average particle size of 40-400 mesh, advantageously 100-200 mesh. Particularly good results are attained when the melt viscosity of the chlorinated polymer is approximately 24, in poises/1000, and the chlorine content is approximately 36% by weight.

The polymeric processing aid-secondary modifier employed is a polymeric material which has a heat distortion temperature of at least 155°F. and which, during extrusion and in the final homogeneous fusion blend, counteracts the inherent tendency of the chlorinated polyethylene to decrease the resistance of the finished product to heat distortion. The polymeric processing-aid secondary modifier is selected from the group consisting of acrylic polymers and copolymers; acrylonitrile-butadiene-styrene copolymers; mixtures of an acrylonitrile-butadiene-styrene copolymer and at least one additional polymeric material selected from the group consisting of acrylic polymers, acrylic copolymers, and ethylene-vinyl acetate copolymers; copolymers of vinyl chloride with an alkyl vinyl ether in which the alkyl group contains 8-18 carbon atoms; and polymers produced by grafting vinyl chloride onto an ethylene-vinyl acetate copolymer. Suitable acrylic polymers include methyl methacrylate homopolymer, and copolymers of methyl methacrylate with lesser amounts of lower alkyl acrylates in which the alkyl group contains 1-4 carbon atoms, copolymers of methyl methacrylate and ethyl acrylate being particularly advantageous, with such polymers and copolymers having a molecular weight in the range of 300,000-2,000,000. When copolymers of methyl methacrylate and a lower alkyl acrylate are employed, the methyl methacrylate should constitute 60-98% by weight of the copolymer. Particularly suitable acrylonitrile-butadiene-styrene copolymers are those containing 20-30% by weight acrylonitrile, 15-30% by weight butadiene, and 40-65% by weight styrene, with the heat distortion temperature of the copolymer being in the range of 180°-185°F., as determined by ASTM D-648-56. Suitable ethylene-vinyl acetate copolymers are those having a vinyl acetate content of 10-30 % by weight. When mixtures of acrylonitrile-butadiene-styrene copolymer and an additional polymer are employed, the weight ratio of acrylonitrile-butadiene-styrene polymer to the additional polymer should be in the range of 55:45 to 80:20, when the additional polymeric material is an acrylic polymer or copolymer, and from 40:60 to 80:20, when the additional polymeric material is an ethylene-vinyl acetate copolymer.

When the processing aid-secondary modifier is a copolymer of vinyl chloride and an alkyl vinyl ether, the copolymer can contain 60-99.5% by weight of vinyl chloride and 0.5-40% by weight of alkyl vinyl ether. Copolymers of vinyl chloride with cetyl vinyl ether, in which the cetyl vinyl ether content is 2-10% by weight, are particularly advantageous. When a graft polymer of vinyl chloride and ethylene-vinyl acetate copolymer is employed, best results are achieved when the ethylene-vinyl acetate copolymer content of the graft polymer is in the range of 40-60%, and advantageously about 50% by weight. Particularly good results are obtained using said graft polymer and methyl methacrylate and a lower alkyl acrylate in a weight ratio of from 1:1 to 5:1.

Whether comprising a single polymer or a polymeric mixture, the processing aid-secondary modifier is employed in particulate form, with an average particle size in the range of 40-300 mesh, advantageously 100-300 mesh.

In addition to the foregoing polymeric materials, the invention can be practices with improved results with the aid of certain additives and modifiers. In the production of coilable pipe, it is advantageous to employ at least one particulate filler having an average particle size smaller than that of the polymeric constituents, and an oil absorption capability of at least 5 lbs. per 100 lbs. of filler. Suitable fillers have an average particle size of 0.15-0.5 micron. Especially good results are obtained with titanium dioxide having an oil absorption in excess of 15 lbs. per 100 lbs. of titanium dioxide, and an average particle size of 0.25-0.3 micron.

In order to achieve satisfactory extrusion, it is necessary that the extrusion compositions include an agent capable of stabilizing the polyvinyl chloride and chlorinated polyethylene against auto-catalytic decomposition during extrusion. Though the various conventional stabilizers can be employed, markedly improved results are achieved by employing a combination of tribasic lead sulfate, dibasic lead stearate and normal lead stearate, with the two stearates each held below a critical level of 0.7% of the polyvinyl chloride weight, and with the tribasic lead sulfate employed in an amount which is relatively large in comparison with the amounts of the two stearates. Excellent results are also obtained by employing only tribasic lead sulfate and dibasic lead stearate, without normal lead stearate, with the amount of dibasic lead stearate then being increased proportionately to compensate for the omission of the normal lead stearate.

It has been found that there is a tendency for the chlorinated polyethylene to break down, by thermal and auto-catalytic decomposition, during extrusion before thermal and autocatalytic decomposition of the polyvinyl chloride occurs, this earlier decomposition of the chlorinated polyethylene tending to use up the stabilizing agent or agents, such as the lead salts, before the need for stabilizing the polyvinyl chloride arises. To avoid this, the chlorinated polyethylene is pre-blended with a portion of the stabilizing agent or agents in such fashion as to provide a free-flowing preliminary composition in which at least that amount of stabilizing agent or agents necessary to stabilize the chlorinated polyethylene is intimately associated with, and advantageously directed adhered to, the particles of chlorinated polyethylene.

The compositions also employ internal lubricants and, for this purpose, fatty acids such as stearic acid, oleic acid, and palmitic acid; fatty acid soaps; amine waxes, polyethylene waxes; and montan wax are all suitable.

The ability to achieve prolonged extrusion runs in accordance with the invention is based on the discovery that, when the polymeric composition to be extruded contains polyvinyl chloride, or both polyvinyl chloride and a filler such as titanium dioxide, in addition to at least one lead salt a stabilizer, a stabilizer, the problems arising from the tendency of the stabilizer to plate out can be greatly minimized by including in the composition an amount of finely divided calcium carbonate, either uncoated or coated wth a fatty acid salt, which is equal to 1-4% of the weight of polyvinyl chloride employed. Employing calcium carbonate according to the invention, continuous extrusion runs of 7-10 days having been achieved, even when the extrusion composition contained a significant amount of chlorinated polyethylene in addition to the polyvinyl chloride. Omitting the calcium carbonate, the extruder has to be shut down and cleaned after relatively short runs, e.g., 12–30 hours.

Though the reasons for such success are not fully understood, it appears that the calcium carbonate has three beneficial results. First, its presence in the composition during mixing or blending thereof preparatory to extrusion, increases the amount of work required for proper mixing and thereby causes the fine particles of the lead salt stabilizer to be more uniformly distributed with respect to the polyvinyl chloride particles. Next, being capable of reacting with hydrochloric acid, the calcium carbonate itself serves as an acid acceptor to stabilize against auto-catalytic decomposition. Finally, presence of the calcium carbonate allows the amount of titanium dioxide to be held to not more than 1% of the polyvinyl chloride weight, as compared to the usual 3–6%, and, there being less titanium dioxide present, the problem of plate out of the lead salt is correspondingly diminished.

The compositions also employ internal lubricants and, for this purpose, fatty acids such as stearic acid, oleic acid, and palmitic acid; fatty acid soaps; amine waxes; polyethylene waxes; and montan wax are all suitable.

The operative proportional ranges for the various ingredients of the extrusion compositions are as follows:

| Ingredient | Percent of Polyvinyl Chloride Weight | |
|---|---|---|
| | Lower Limit | Upper Limit |
| Chlorinated polyethylene | 4.0 | 12.0 |
| Processing aid-secondary modifier | .5 | 6.0 |
| Titanium dioxide | 0.25 | 1.0 |
| Zinc oxide | 0.50 | 2.0 |
| Tribasic lead sulfate | 4.0 | 7.5 |
| Dibasic lead stearate | 0.2 | 1.5 |
| Normal lead stearate | 0 | 0.7 |
| Calcium carbonate | 1.0 | 4.0 |
| Lubricant | 0.01 | 0.5 |

While the invention is operative when amounts of chlorinated polyethylene up to 12% of the polyvinyl chloride weight are employed, superior results are achieved when the chlorinated polyethylene does not exceed an amount equal to 7% of the weight of the polyvinyl chloride. As earlier indicated, it is desirable to employ as the processing aid-secondary modifier materials comprising both acrylonitrile-butadiene-styrene copolymer and at least one additional polymeric material selected from the group consisting of acrylic polymers and copolymers and ethylene-vinyl acetate copolymers. When an acrylic polymer or copolymer is employed as the additional polymeric material, particularly good results are obtained when the acrylonitrile-butadiene-styrene copolymer amounts to 2–3% of the polyvinyl chloride weight and the acrylic polymer correspondingly amounts to 1–2% of the polyvinyl chloride weight. Similarly, when the additional polymeric material is an ethylene-vinyl acetate copolymer, particularly good results are attained when the acrylonitrile-butadiene-styrene copolymer amounts to 1–3% of the polyvinyl chloride weight, and the weight of the ethylene-vinyl acetate copolymer is approximately equal to that of the acrylonitrile-butadiene-styrene copolymer.

Use of a graft polymer of vinyl chloride and ethylene-vinyl acetate copolymer as the processing aid-secondary modifier is advantageous because the desired properties of the extruded article can be achieved with a relatiively small proportion of the processing aid-secondary modifier, as low as 0.6%, based on the polyvinyl chloride weight. Especially good results are achieved using an even smaller proportion of the graft polymer of vinyl chloride and ethylene-vinyl acetate copolymer in combination with a larger, but still relatively small, amount of an acrylic polymer. Thus, the graft polymer can be employed in the range of 0.1–0.5%, based on polyvinyl chloride weight, with an amount of acrylic polymer correspondingly in the range of 2–3 times the weight of the graft polymer.

It is particularly important that the extrusion compositions be in the form of uniformly mixed, completely free-flowing dry blends which are essentially free from lumps or agglomerates. For this reason, the invention employes the fillers and stabilizers in very finely divided form, the particles thereof being sufficiently smaller than the polymer particles to allow the filler and stabilizer particles to be adhered to the surfaces of the polymer particles during dry blending. Mixing is carried out with the aid of conventional equipment of the type commonly characterized as an intensive blender, the speed and vigorousness of the mixing operation being controlled and of such magnitude as to cause an increase in the temperature of the product. Mixing is so carried out that the surfaces of the polymer particles are softened, with the result that the filler and stabilizer particles are adhered to and embedded in the polymer particles. By limiting the product temperature to a value below 250–260°F., however, depending upon the specific polymers employed, agglomeration of the polymer particles is avoided. Advantageously, the temperature of the mixture is kept below 245°F. during the mixing operation.

The following examples illustrate preparations of polyvinyl chloride extrusion compositions according to the invention:

EXAMPLE 1

Commencing at room temperature, 200 lbs. of polyvinyl chloride having a Fikentscher K-value of 69.4, as determined in 1% cyclohexanone at 25°C. (corresponding to a specific viscosity of 0.41 as determined by ASTM D1243-58T, Method B) was charged to a centrifugal intensive blender manufactured by Caccia-Perino, Milan, Italy, and identified as Model CP/2. The polyvinyl chloride had a bulk density of 0.48 g./cc. and the particle size distribution tabulated below:

| Screen, U.S. Standard | %/Wt. Retained |
|---|---|
| 40 mesh | nil |
| 60 mesh | nil |
| 80 mesh | 1.0 |
| 100 mesh | 9.6 |
| 140 mesh | 65.8 |
| 200 mesh | 21.4 |
| pan | 2.2 |

Charged to the intensive blender concurrently with the polyvinyl chloride was 10 lbs. of chlorinated polyethylene having a melt viscosity of 24, in poises/1000, a chlorine content of 36% by weight, and an average particle size between 100 and 200 mesh. The chlorinated polyethylene employed was that sold by Dow Chemical Company, Midland, Michigan, under the trademark TYRIN QX2243.16. The blender was started at low speed and then operated at high speed until the product temperature reached 195°F.

Ten pounds of tribasic lead sulfate, 1.2 lbs. of dibasic led stearate, and 1.2 lbs. of normal lead stearate, all finer than 325 mesh, were then added, and the blender operated at high speed until a temperature of 212°F. was reached. Calcium carbonate in the amount of 3 lbs. and having an average particle size of approximtely 200 mesh was then added, along with 1 lb. of titanium dioxide having an average particle size of 0.3 micron and an oil absorption capacity of 18 lbs. per 100 lbs. of titanium dioxide, and high speed mixing was continued until the product attained a temperature of 225°F.

The processing aid-secondary modifier employed was an acrylic product predominantly comprising a methyl methacrylate polymer sold by Rohm & Haas Co., Philadelphia, Pennsylvania, under the trademark ACRYLOID KM-229, having a specific gravity of 1.06, a heat distortion temperature of approximately 165°F. determined by ASTM D648-56 at 264 p.s.i., and the following particle size distribution:

| Screen, U.S. Standard | %/Wt. Retained |
|---|---|
| 20 mesh | nil |
| 60 mesh | 0.5 |
| 100 mesh | 12.4 |
| 200 mesh | 22.9 |
| 300 mesh | 60.0 |

Six pounds of the processing aid-secondary modifier was added to the mixture in the blender and the blender was operated at high speed until the blend attained a temperature of 232°F., 0.05 lbs. of an amine was (ACRAWAX-C, manufactured by Glyco Chemicals, Inc., New York New York) was then added as an internal lubricant and the blender was operated briefly at low speed. The resulting mixture was discharged to a ribbon blender-cooler which was operated to agitate the mixture continuously until its temperature was slightly below 120°F., at which point the composition was ready to be fed to the extruder.

The dry blend thus produced was a free flowing, heterogeneous mixture essentially free from lumps, particles of the lead salts and the titanium dioxide being adhered to and embedded in the surfaces of the particles of the polymeric materials. The mixture was uniform in the same sense that all increments thereof contained the ingredients in essentially the same proportions.

EXAMPLE 2

A dry blend extrusion composition was prepared by repeating the procedure of Example 1, save that the processing aid of that example was replaced by 6 lbs. of an acrylonitrile-butadiene-styrene graft copolymer containing 24% by weight acrylonitrile, 20% by weight butadiene, and 56% by weight styrene, the copolymer having a heat distortion temperature of 180° F. at 264 p.s.i. as determined by ASTM D648-56, izod impact strength of 12 ft.-lb./in. at 73° F. as determined by ASTM D256-56, a specific gravity of 1.05, a melt index of 0.1 at 5 kg. load and 200° C., determined by ASTM Test Condition G. and an average particle size between 100 and 200 mesh.

EXAMPLE 3

A dry blend extrusion composition was prepared by repeating the procedure of Example 1 but employing as the processing aid-secondary modifier a combination of 4 lbs. of the acrylonitrile-butadiene-styrene copolymer described in Example 2, and 2 lbs. of a copolymer of 85% by weight methyl methacrylate and 15% by weight ethyl acrylate, said copolymer having a molecular weight in excess of 500,000, and an average particle size between 100 and 200 mesh.

EXAMPLE 4

Three dry blend extrusion compositions were prepared in accordance with Example 1, but with different amounts of chlorinated polyethylene and acrylic polymer, as follows:

| Composition | Chlorinated Polyethylene | Acrylic Polymer |
|---|---|---|
| A | 12 lbs. | 3 lbs. |
| B | 17 lbs. | 2 lbs. |
| C | 23 lbs. | 1 lb. |

EXAMPLE 5

Example 1 was repeated, save that the titanium dioxide was replaced by 2 lbs. of zinc oxide having an average particle size of 0.3 micron.

EXAMPLE 6

A dry blend extrusion composition was prepared by repeating the procedure of Example 1 but employing as the processing aid-secondary modifier a combination of 3 lbs. of the acrylonitrile-butadiene-styrene copolymer described in Example 2, and 3 lbs. of an ethylene-vinyl acetate copolymer marketed by U.S.I. Chemicals Division, National Distillers & Chemical Corp., New York, New York, U.S.A., under the identification MU760X and characterized by an ethylene-to-vinyl acetate weight ratio of 80:20. The ethylene-vinyl acetate copolymer was in the form of a fine powder, with an average particle size within the range of 100–300 mesh.

EXAMPLE 7

Employing the same equipment as in Example 1, 100 parts by weight of the same chlorinated polyethylene and 0.8 parts by weight of mineral oil were charged cold to the blender, and the blender operated until the material temperature reached 130° F. Twenty part by weight of the tribasiic lead sulfate was then added and the blender operated until the temperature reached 180° F., at which time the mixture was discharged to a cooler. The resulting free-flowing non-agglomerated blend is a masterbatch in which the finer particles of tribasic lead sulfate are attached to and embedded in the larger particle of chlorinated polyethylene.

An extrusion blend was then prepared, using the sample equipment, by charging 200 parts by weight of the polyvinyl chloride, 10.7 parts by weight of the tribasic lead sulfate, and 2 parts by weight of the dibasic lead stearate to the blender and operating the blender to bring the material temperature to 160° F. Ten parts by weight of the chlorinated polyethylene masterbatch and 1.5 parts by weight of an ethylene-vinyl acetate copolymer onto which vinyl chloride had been grafted to give a product having a copolymer content of about 50% were then added, and blending continued as in Example 1 with the subsequent addition of 0.5 part by weight of calcium stearate, 0.1 part by weight of stearic acid, and 0.1 part by weight of an amine wax, as lubricants, and 1 part by weight of the titanium dioxide and 3 parts by weight of the calcium carbonate.

masterbatch so prepared can be used in preparation of any of the extrusion blends herein disclosed.

EXAMPLE 9

Employing the chlorinated polyethylene masterbatch of Example 8, three extrusion blends were prepared with the formulations set out below:

| INGREDIENT | Parts by Weight | | |
| --- | --- | --- | --- |
| | Blend A | Blend B | Blend C |
| Polyvinyl chloride of Example 1 | 100.00 | 100.00 | 100.00 |
| Processing aid-secondary modifier I | — | .50 | .75 |
| Processing aid-secondary modifier II | — | 3.00 | — |
| Processing aid-secondary modifier III | 0.75 | — | 0.25 |
| Chlorinated polyethylene masterbatch of Example 8 | 5.00 | 5.00 | 5.00 |
| Tribasic lead sulfate of Example 1 | 5.35 | 5.35 | 5.35 |
| Dibasic lead stearate of Example 1 | 1.00 | 1.00 | 1.00 |
| Calcium stearate | 0.25 | 0.35 | 0.25 |
| Stearic acid | 0.05 | 0.05 | 0.05 |
| Amine wax | 0.05 | 0.05 | 0.05 |
| Calcium carbonate of Example 1 | 1.50 | 1.50 | 1.50 |
| Titanium dioxide of Example 1 | 0.50 | 0.50 | 0.50 |

The foregoing example illustrates the masterbatch procedure of the invention, for assuring that the earlier need of the chlorinated polyethylene for the lead salt stabilizers will not deprive the polyvinyl chloride of adequate stabilization, and also demonstrates the use of a graft polymer of vinyl chloride and ethylene-vinyl acetate copolymer as a processing aid-secondary modifier.

EXAMPLE 8

A chlorinated polyethylene masterbatch was prepared, using the intensive blender described in Example 1, by first charging 160 parts by weight of the same chlorinated polyethylene into the blender and operating the blender until a material temperature of 130° F. was reached, at which point 0.8 parts by weight of a polyoxyethylene sorbitan monooleate having a specific gravity of 1.05–1.1 was added. Mixing was then continued to a material temperature of 150° F., and 32 parts by weight of the tribasic lead sulfate then added. Operation of the blender was continued until the material temperature reached 180° F., and 40 parts by weight of the calcium carbonate was introduced, mixing then being continued to a temperature of 200° F. and the masterbatch then discharged to a cooler and cooled, with agitation, to 120° F.

The masterbatch so prepared is a free-flowing, heterogeneous mixture essentially free from agglomerates and characterized by the particles of tribasic lead sulfate being adhered to and embedded in the particles of chlorinated polyethylene. In this connection, with the particle size of the lead salt being finer than 325 mesh and the chlorinated polyethylene having an average particle size between 100 and 200 mesh, it will be understood that the sequence of temperatures attained in, and the mechanical working effected by, the intensive blender are effective to assure attachment of the lead salt particles to the chlorinated polyethylene in a manner which will survive the further blending and handling preparatory to extrusion. Masterbatches prepared according to this example include all of the calcium carbonate for the extrusion formulation, it thus being assured that a more favorable distribution of the calcium carbonate relative to the chlorinated polyethylene will be achieved in the final extrusion blend. The The processing aid-secondary modifier I is a poly (methyl methacrylate) having a heat distortion temperature of 196° F., a molecular weight of approximately 500,000, and an average particle size between 100 and 200 mesh. Processing aid-secondary modifier II is the acrylic polymer of Example 1. Processing aid-secondary modifier III is a polymer produced by grafting vinyl chloride into an ethylene-vinyl acetate copolymer to give an ethylene-vinyl acetate copolymer content of approximately 50% by weight, a chlorine content of approximately 28% by weight, a Fikentscher K value of 78, and an average particle size between 100 and 200 mesh.

The complete extrusion blends were prepared, using the intensive blender of Example 1, by charging the polyvinyl chloride, chlorinated polyethylene masterbatch, tribasic lead sulfate and dibasic lead stearate to the blender at room temperature, operating the blender until a material temperature of 190° F. was attained, introducing the calcium stearate and operating the blender until a material temperature of 200° F. results, then adding the respective processing aid-secondary modifier and continuing operation of the blender to a temperature of 210° F., adding the amine wax and stearic acid and continuing the blending operation until the temperature reached 220° F., introducing the calcium carbonate and titanium dioxide and mixing to a temperature of 250° F., then discharging to the cooler and cooling, with mixing, to 120° F. All three blends were free-flowing and substantially agglomerate free.

It is of particular importance to carry out extrusion of the foregoing compositions in such fashion that a reverse temperature profile will be maintained in the barrel of the extruder. In general, the barrel temperature of the extruder is maintained in the range of 350°–380° F. at the inlet end and in the range of 300°–365° F. at the outlet end, the temperature of the die lips being maintained in the range of 315°–365° F.

EXAMPLE 10

The composition prepared in accordance with Example 1 was formed into continuous pipe of 2 inch O.D., using a 2½ inch PRODEX screw-operated extruder, manufactured by Prodex Division, Koehring Company, Fords, New Jersey, the extruder being equipped for oil-cooling of the screw. The extruder was operated at 60 r.p.m., with a head pressure of approximately 3000 p.s.i., to produce slightly more than 200 lbs. of product per hour. Temperatures were maintained as follows:

| | |
|---|---|
| Barrel, feed end | 375° F. |
| Barrel, gate end | 330° F. |
| Die spider | 375° F. |
| Die lips | 322° F. |

The screw was cooled by continuously circulating a high temperature cooling oil, maintaining a temperature of 170° F. at the inlet to the screw and a temperature of 182° F. at the outlet. The die gap of the pipe die was set to provide a pipe wall thickness of 0.095 inch.

The pipe produced was found to have an impact strength of 160 ft. lbs. as determined by the ASTM TUP drop test at room temperature, and a 85 ft. lbs., as determined by that test at 0° C. The apparent tensile strength was 7400 p.s.i., determined by Canadian Standards Association test CSA B1374-Plastic Pipe for Gas Service, Item 5.5. The pipe passed the ASTM D1598-58T sustained pressure test at 430 p.s.i. Heat distortion temperature for the product was 162° F. The pipe was of such flexibility as to be readily coilable into, and unwound from, coils of 8 ft. diameter. The finished product had a heat distortion temperature of 162° F. as determined at 264 p.s.i. by ASTM D648-56.

The extrusion run was maintained continuously for 7 days, on a 24-hour per day basis, without requiring shut down for removal of plated out material.

EXAMPLE 11

Employing the same equipment and operating conditions described in Example 10, pipe having an O.D. of 2 inch was extruded continuously with the dry blend composition of Example 6. The pipe so produced had the following characteristics, determined respectively by the test procedures referred to in Example 7:

| | |
|---|---|
| Impact strength | 156 ft. lbs. |
| Apparent tensile strength | 7350 p.s.i. |
| Heat distortion temperature | 158° F. |

The pipe passed the ASTM D1598-58T sustained pressure test at 430 p.s.i., and was observably more coilable than that produced in accordance with Example 9.

EXAMPLE 12

Blends A, B and C of Example 9 were extruded into 2 inch coilable pipe in a 3½ inch single screw, vented extruder manufactured by Prodex Division, Koehring Company, Fords, New Jersey, the extruder being equipped for oil-cooling of the screw, the screw having two compression stages and an L/D ratio of 24:1. The extrusion conditions were as follows:

| CONDITION | BLEND A | BLEND B | BLEND C |
|---|---|---|---|
| Extruder temperature: | | | |
| Feed end | 360°F. | 360°F. | 360°F. |
| Compression zone | 360°F. | 360°F. | 360°F. |
| Decompression zone | 350°F. | 345°F. | 350°F. |
| Die temperatures: | | | |
| Spider | 380°F. | 390°F. | 380°F. |
| Lips | 350°F. | 355°F. | 350°F. |
| Screw temperatures: | | | |
| Oil in | 170°F. | 165°F. | 175°F. |
| Oil out | 185°F. | 170°F. | 190°F. |
| Screw speed | 37 r.p.m. | 37 r.p.m. | 40 r.p.m. |
| Output rate | 250 lb/hr | 243 lb/hr | 270 lb/hr |

While the results of all three extrusion runs were favorable, Blend C gave distinctly better results than did Blends A and B.

Characteristics of the pipe produced were as follows:

| PROPERTY | BLEND A | BLEND B | BLEND C |
|---|---|---|---|
| Apparent tensile strength[1] | 7600 p.s.i. | 7500 p.s.i. | 7700 p.s.i. |
| Impact strength[2] | | | |
| 73°F. | 157 ft.lbs. | 150 ft.lbs. | 157 ft.lbs. |
| 32°F. | 122 ft.lbs. | 122 ft.lbs. | 122 ft.lbs. |
| Burst pressure | 750 p.s.i. | 725 p.s.i. | 750 p.s.i. |

[1]Canadian Standards Assoc. test CSA B1374-Plastic Pipe for Gas Service, Item 55
[2]ASTM TUP Drop Test All three products were of such flexibility as to be coilable into, and unwound from, coils of 8 feet diameter.

Extruded products produced according to the invention can be considered as being in the form of an impact toughened polymeric alloy, that is, a "fusion blend" of the polymeric constituents, characterized by having the impact strength increased (in comparison to flexible polyvinyl chloride products heretofore attainable) without an attendant decrease in tensile strength, heat distortion temperature, and other properties.

What is claimed is:

1. As a product of manufacture, coilable polymeric pipe, capable of being installed under ground by being plowed in and suitable for natural gas transmission at low ambient temperatures, in the form of a continuous tubular body of a homogeneous fusion blend comprising polyvinyl chloride having a Fikentscher K-value of 60–80 as determined in 1% cyclohexanone at 25°C.;

chlorinated polyethylene in an amount equal to 4–12% of the weight of said polyvinyl chloride, said chlorinated polyethylene having a chlorine content of 30–55% by weight and a melt viscosity in poises/1000 of 20–30; an additional polymeric material as a processing aid-secondary modifier in an amount equal to 0.5–6% of the weight of said polyvinyl chloride, having a heat distortion temperature of at least 155°F., and selected from the group consisting of methyl methacrylate homopolymer; copolymers of methyl methacrylate and lesser amounts of a lower alkyl acrylate; mixtures of said homopolymer and copolymers; acrylonitrile-butadiene-styrene copolymers containing 20–30% by weight acrylonitrile, 15–30% by weight butadiene and 40–65% by weight styrene; mixtures of said acrylonitrile-butadiene-styrene copolymers with lesser amounts of at least one additional polymeric material selected from the group consisting of said methyl methacrylate homopolymer and copolymers and ethylene-vinyl acetate copolymers containing 10–30% by weight vinyl acetate; copolymers of vinyl chloride with an alkyl vinyl ether in which the alkyl group contains 8–18 carbon atoms, said copolymers containing 60–99.5% by weight vinyl chloride and 0.5–40% by weight alkyl vinyl ether; and polymers produced by grafting vinyl chloride onto an ethylene-vinyl acetate copolymer to produce a polymer containing 40–60% by weight ethylne-vinyl acetate; and a minor proportion of a finely divided inorganic filler selected from the group consisting of titanium dioxide and zinc oxide, the amount of said filler being in the range of 0.25–1% for titanium dioxide and 0.5–2% for zinc oxide, based on the weight of said polyvinyl chloride;

said pipe having an impact strength at 0°C. of at least 85 ft. lbs. as determined for 2 inch O.D. pipe by the ASTM TUP drop test, an apparent tensile strength of at least 7000 p.s.i. as determined by Canadian Standards Association test CSA B1374--Plastic Pipe for Gas Service, Item 5.5, and a heat distortion temperature of at least 155°F. as determined by ASTM D648-56 at 264 p.s.i., said pipe being sufficiently flexible to be coiled into coils of 4 feet dia., for ½ inch O.D. pipe, and 8 feet dia., for 2 inch O.D. pipe, and uncoiled from such coils at 0°F., without damage to the pipe.

2. Coilable polymeric pipe according to claim 1, herein said chlorinated polyethylene amounts to 4–7% of the weight of said polyvinyl chloride; and said additional polymeric material comprises an acrylonitrile-butadiene-styrene copolymer in an amount equal to 2–3% of the weight of said polyvinyl chloride, said acrylonitrile-butadiene-styrene copolymer containing 20–30% by weight acrylonitrile, 15–30% by weight butadiene, and 40–65% by weight styrene, and an acrylic polymer in an amount equal to 1–2% of the weight of said polyvinyl chloride and selected from the group consisting of methyl methacrylate homopolymer, copolymers of methyl methacrylate and lesser amounts of a lower alkyl acrylate.

3. Coilable polymeric pipe according to claim 1, herein said chlorinated polyethylene amounts to 4–7% of the weight of said polyvinyl chloride; and said additional polymeric material comprises an acrylonitrile-butadiene-styrene copolymer in an amount equal to 1–3% of the weight of said polyvinyl chloride, said acrylonitrile-butadiene-styrene copolymer containing 20–30% by weight acrylonitrile, 15–30% by weight butadiene, and 40–65% by weight styrene, and an ethylene-vinyl acetate copolymer containing 10–30% by weight vinyl acetate, the weight ratio of said acrylonitrile-butadiene-styrene copolymer to said ethylene-vinyl acetate copolymer being in the range of from 40:40 to 80:20.

4. Coilable polymeric pipe according to claim 1, herein said chlorinated polyethylene amounts to 4–7% of the weight of said polyvinyl chloride, and said additional polymeric material comprises an acrylic polymer selected from the group consisting of methyl mecthacrylate homopolymer, copolymers of methyl methacrylate and a lower alkyl arylate, and mixtures of said homopolymer and copolymers, and a polymer produced by grafting vinyl chloride onto an ethylene-vinyl acetate copolymer to produce a polymer containing 40–60% by weight ethylene-vinyl acetate, the weight ratio of said acrylic polymer to said last-mentioned polymer being in the range of from 1:1 to 5:1.

5. A process for producing the coilable polymeric pipe of claim 1, comprising supplying said polyvinyl chloride, said chlorinated polyethylene, said additional polymeric material, said inorganic filler, and a stabilizing proportion of at least one compound effective to inhibit auto-catalytic decomposition of said polyvinyl chloride and said chlorinated polyethylene to an extruder in the form of a uniform dry blend, said polyvinyl chloride having and average particle size in the range of 100–400 mesh, said chlorinated polyethylene having an average particle size in the range of 40–400 mesh, and said additional polymeric material having an average particle size of 40–300 mesh; and operating the extruder to thermally plastify and mix said composition and force the same continuously through an annular die orifice while maintaining a reverse temperature profile in the barrel of the extruder, the barrel temperature of the extruder being maintained in the range of 350°–380°F. at the inlet end and 300°–365°F. at the outlet end, the temperature of the die lips being maintained in the range of 315°–363°F., and the head pressure of the extruder being maintained in the range of 2500–3500 p.s.i.

6. A process according to claim 5, wherein said compound effective to inhibit auto-catalytic decomposition of said polyvinyl chloride and said chlorinated polyethylene is at least one finely divided lead salt of an average particle size smaller than that of said chlorinated polyethylene, the total amount of said at least one lead salt being in the range of 4.4–8.9% of the weight of said polyvinyl chloride, a portion of said lead salt being present initially as particles adhered to and embedded in particles of said chlorinated polyethylene.

7. A process according to claim 5, wherein said inorganic filler is titanium dioxide in an amount equal to 0.25–1% of the weight of said polyvinyl chloride.

8. A process according to claim 5, wherein said polyvinyl chloride, said chlorinated polyethylene and said processing aid-secondary modifier all have an average particle size in the range of 100–200 mesh, said chlorinated polyethylene has a chlorine content of approximately 36% by weight and a melt viscosity in poises/1000 of approximately 24, and said inorganic filler is titanium dioxide in an amount approximately equal to 0.5% of the weight of said polyvinyl chloride.

* * * * *